United States Patent [19]

Kondo

[11] Patent Number: 5,075,700

[45] Date of Patent: Dec. 24, 1991

[54] MAGNETIC RECORDING DEVICE

[75] Inventor: Nobuhiro Kondo, Tokyo, Japan

[73] Assignee: Seikosha Co., Ltd., Tokyo, Japan

[21] Appl. No.: 584,303

[22] Filed: Sep. 18, 1990

[30] Foreign Application Priority Data

Sep. 19, 1989 [JP] Japan .................................. 1-242509
Nov. 17, 1989 [JP] Japan .................................. 1-298864

[51] Int. Cl.[5] .............................................. G11B 9/00
[52] U.S. Cl. .................................... 346/74.2; 101/489
[58] Field of Search .............................. 346/74.2–74.6; 101/489

[56] References Cited

U.S. PATENT DOCUMENTS 4,427,987 1/1984 Kikuchi .............................. 346/74.4
4,458,252 7/1984 Kikuchi et al. .................... 346/74.4
4,489,332 12/1984 Ohta .............................. 346/74.2 X
5,018,445 5/1991 Six ................................. 346/74.2 X

*Primary Examiner*—George H. Miller, Jr.
*Attorney, Agent, or Firm*—Jordan and Hamburg

[57] ABSTRACT

In a method and device for providing a visible image on a magnetic layer, the layer having a magnetic image thereon, the magentic layer is moved at a distance spaced from the top surface of a body of a magnetic fluid. The distance is sufficiently small that magnetic fluid from said body can be attracted to contact portions of said magnetic layer having a magnetic image thereon, by magnetic attraction, while the fluid is not attracted to portions of the layer that do not have a magnetic image.

7 Claims, 2 Drawing Sheets

MAGNETIC RECORDING DEVICE

FIELD OF THE INVENTION

The present invention relates to a magnetic recording device for using a magnetic fluid as a developing agent.

BACKGROUND OF THE INVENTION

A magnetic recording method has been proposed which forms a magnetic image on a magnetic layer into a visual image with a magnetic material such as a magnetic toner and the like. Since a magnetic image has a high resolution degree, this magnetic recording method shows promise as a method for forming a high resolution pattern.

When magnetic toner is used as the magnetic material, however, since the particle diameter of the magnetic toner is more than 10 micrometer, the formation of a fine pattern corresponding to the magnetic image has not been obtained.

In order to solve the above-described problem, a magnetic recording device has been suggested in which a magnetic fluid is used as the magnetic material. (For example, cf. the official publication of the Japanese Patent Application Laid-Open No. 48063/1985). The magnetic recording device disclosed in the official publication of the Japanese Patent Application Laid-Open No. 48063/1985 immerses the surface of a movable body, in which magnetic image is formed, in a magnetic fluid, and, while rotating the movable body, the magnetic image is successively formed into a visible image.

Since in a magnetic recording device using a magnetic fluid as a magnetic material in the conventional manner, the development is carried out by immersing the surface of a movable body formed with a magnetic image thereon in a magnetic fluid, the magnetic fluid adheres to the part other than the magnetic image part, resulting in the generation of such deterioration of the recording quality as the lowering of the resolution, etc.

SUMMARY OF THE INVENTION

An object of the present invention is to improve the recording quality in a magnetic recording device using a magnetic fluid as the magnetic material.

BRIEF DESCRIPTION OF THE DRAWINGS

In order that the invention may be more clearly understood, it will now be discussed in greater detail with reference to the accompanying drawings, wherein.

DESCRIPTION OF THE PREFERRED EMBODIMENTS

First, an explanation will be given of the respective constitutional elements.

Numeral 11 denotes a magnetic layer which has been formed by dispersing a powder such as $Fe_2O_3$, $CrO_2$, Fe (iron), Ni (nickel), Co (cobalt), etc. in a resin. Although it is not shown in the figure, a protective layer may be provided on the surface of this magnetic layer 11.

Numeral 12 denotes a circular pillow or circular tubular substrate. A magnetic layer 11 is formed on its surface. The substrate is rotated in the direction of the arrow.

The movable body 13 is comprised of the above-described magnetic layer 11 and the substrate 12.

Numeral 14 denotes a write head that comprises a magnetic image forming means, for writing a magnetic pattern in the magnetic layer 11 to form a magnetic image.

Numeral 15 denotes a magnetic erasing head for erasing the magnetic image.

Numeral 16 denotes a cleaning blade for removing the magnetic fluid (described later) etc. adhered to the surface of the movable body 13 and for cleaning the surface of the movable body 13.

Numeral 17 denotes a recording medium, for which, in general, a transcription paper or the like may be used.

Figure 1:
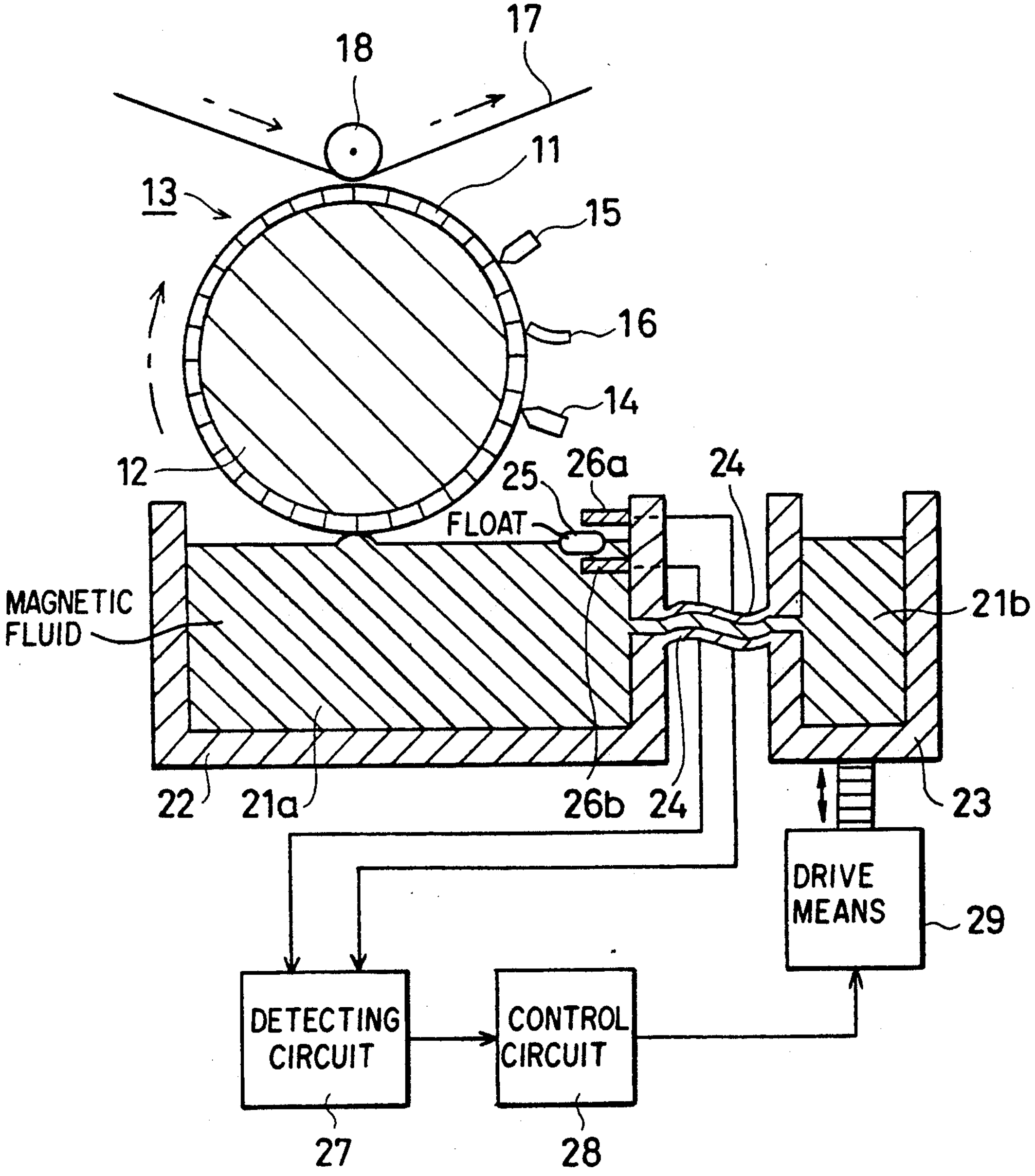
FIG. 1 is a simplified illustration of an embodiment of the present invention.
Figure 2:
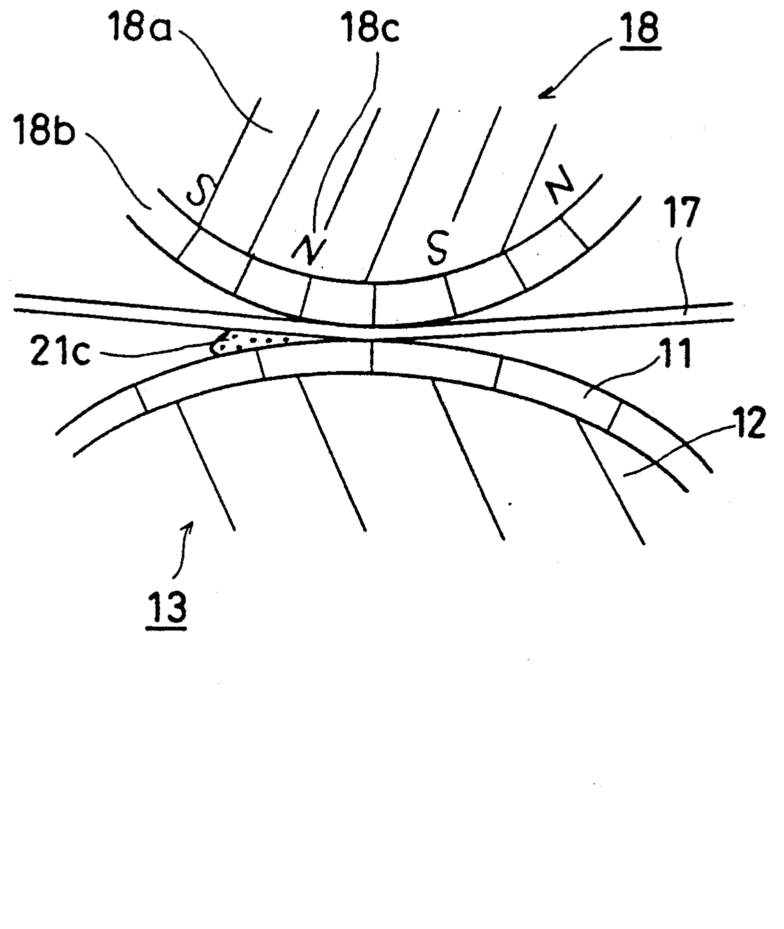
FIG. 2 is a simplified illustration showing the vicinity of the transfer part of the arrangement of FIG. 1.

Numeral 18 denotes a transcription roller for successively transferring the developed pattern formed by the magnetic fluid in correspondence to the magnetic image on the magnetic layer 11 on the recording medium 17. This transcription roller 18 is comprised of a fixed magnet **18*a* and a sleeve 18*b* as shown in FIG. 2. The fixed magnet 18*a* is one in which an N pole and an S pole are alternatively arranged in the circular circumferential direction thereof. The fixed magnet does not rotate. A sleeve 18*b* is provided on the circumference of the fixed magnet 18*b*** and rotates in the circular circumferential direction thereof.

Numeral **21*a* and 21*b* denote magnetic fluids which have been formed by suspending a ferromagnetic powder of about 10 nanometer in water or in an organic solvent. These magnetic fluids 21*a* and 21*b* adhere to the upper part of the magnetic image of the magnetic layer 11** by means of a magnetic force to form the magnetic image into a visible image.

Numeral 22 denotes a storing means which is a vessel for storing the magnetic fluid **21*a***.

Numeral 23 denotes an auxiliary storing means which is a storing means for storing the magnetic fluid **21*b*. This auxiliary storing means 23 is moved up and down by the driving means 29**.

Numeral 24 denotes a flexible pipe which connects the storing means 22 to the auxiliary storing means 23. By passing through this flexible pipe 24, the magnetic fluids **21*a* and 21*b* flow between the storing means 22 and the auxiliary storing means 23. Therefore, even when the heights of the storing means 22 and the auxiliary storing means 23 change relatively, the liquid surfaces of the magnetic fluids 21*a* and 21*b*** are always kept at the same height.

Numeral 25 denotes a float which moves up and down in correspondence to the change of the height of the liquid surface of the magnetic fluid **21*a***.

Numerals **26*a* and 26*b* denote detecting plates which detect the pressure when the float 25** contacts them. This pressure is output as an electrical signal.

Numeral 27 denotes a detecting circuit which detects when the float 25 contacts one of the detecting plates **26*a* or 26*b* by receiving electric signals from the detecting plates 26*a* and 26*b***.

Numeral 28 denotes a control circuit which generates control signals for raising or lowering the auxiliary storing means 23 by receiving signals from the detecting circuit 27.

Numeral 29 denotes a driving means for letting the auxiliary storing means 23 rise or descend under the control of the control signals from the control circuit 28.

The control means of the invention includes the above-described float 25, detecting plates **26*a* and 26*b*, detecting circuit 27, control circuit 28, and driving means 29**.

An explanation will now be given of the control operation for keeping the distance between the surface of the magnetic fluid 21a stored in the storing means 22, and the surface of the movable body 13, constant.

When the liquid surface of the magnetic fluid 21a descends and the float 25 contacts the detecting plate 26b, electric signals are output from the detecting plate 26b. The detecting circuit 27 detects the contact of the float 25 with the detecting plate 26b, that is, the lowering of the liquid surface of the magnetic fluid 21a, by receiving the electric signals. The control circuit 28 receives signals from the detecting circuit 27 and outputs control signals for raising the auxiliary storing means. The driving means 29 receives the control signals and lets the auxiliary storing means 23 rise to an appropriate height. As a result, the magnetic fluid 21b in the auxiliary storing means 23 flows through flexible pipe 24 into the storing means 22, and the liquid surface of the magnetic fluid 21a in the storing means 22 rises.

On the contrary, when the liquid surface of the magnetic fluid 21a rises and the float 25 contacts the detecting plate 26a, the auxiliary storing means 23 descends for an appropriate distance and the liquid surface of the magnetic fluid 21a in the storing means 22 descends.

In the manner as described above, the surface of the magnetic fluid 21a stored in the storing means 22 and the surface of the movable body 13 are kept at a constant height.

An explanation will now be given of a series of operations such as the formation, transfer, etc. of magnetic image.

A predetermined magnetic pattern is successively written on the magnetic layer 11 by the write head 14, and a magnetic image is formed. When the movable body 13 is rotated, and the magnetic image part comes directly above the magnetic fluid 21a, the liquid surface of the magnetic fluid 21a rises due to the magnetic force acting between the part of the magnetic layer 11 where the magnetic image has been formed and the magnetic fluid 21a. As a result, the magnetic fluid adheres to the surface of the movable body 13 on the part where the magnetic image has been formed, and development is carried out. Since the magnetic force does not act between the part where the magnetic image is not formed and the magnetic fluid 21a, the magnetic fluid does not adhere thereto The developed pattern of the magnetic fluid 21c adhered to the surface of the movable body 13 is transferred by the transcription roller 18 to the recording medium 17 (cf. FIG. 2), and the transfer operation is as follows. The magnetic force acts between the magnetic fluid 21c and the fixed magnet 18a. Since as shown in the example of FIG. 2, the magnetic lines concentrate at the N pole 18c, the magnetic fluid 21c is strongly attracted to this N pole, and it completely coagulates. When the magnetic fluid 21c is coagulated, transfer is effected to the recording medium 17. Therefore, broadening of the magnetic fluid 21c generated during transfer can be suppressed, and an improvement of the resolution can be obtained. When the transfer of the image has finished, the magnetic image is erased by the magnetic erasing head 15. After finishing the magnetic erasing, the magnetic fluid and the like adhered to the surface of the movable body 13 are removed, and the surface of the movable body 13 is cleaned.

In the manner described above, the cycle of a series of magnetic recording is finished.

In the present invention, the surface of the movable body and the surface of the magnetic fluid are kept, in general, in a non-contacting state, and the surface of the movable body and the surface of the magnetic fluid contact at the part only where the magnetic image is formed. The magnetic fluid does not adhere to the part other than the magnetic image part, and an improvement of the recording quality results.

Although the present invention has been described through specific terms, it should be noted here that the described embodiment is not necessarily exclusive and that various changes and modifications may be imparted thereto without departing from the scope of the invention which is limited solely by the appended claims.

What is claimed:

1. A magnetic recording device comprising a movable body having a magnetic layer, a magnetic image forming means for forming a magnetic image on the magnetic layer, a storing means for storing a magnetic fluid for changing the magnetic image into a visible image, and control means for maintaining a space between the surface of the magnetic fluid stored in the storing means and the surface of the movable body, whereby development of a magnetic image on said movable body is effected due to rising of the surface of the magnetic fluid stored in the storing means to contact the surface of the movable body at the part where the magnetic image is formed by magnetic attraction between the magnetic image and the fluid.

2. A magnetic recording device comprising:

a movable body having a magnetic layer;

means for forming a magnetic image on said magnetic layer;

means for storing a magnetic fluid, whereby the magnetic fluid has an upper surface defined generally in a given plane; and means for positioning said magnetic layer at a position spaced a predetermined distance above said plane, said distance being sufficiently small to enable said fluid to rise from said upper surface thereof to said magnetic layer by magnetic attraction of a magnetic image on said surface.

3. A magnetic recording device of claim 2 wherein said movable body comprises a cylindrical body having said magnetic layer on its peripheral surface, and further comprising means for rotating said cylindrical body about an axis parallel to said plane, whereby an image of said fluid corresponding to said magnetic image is formed on said magnetic layer.

4. A magnetic recording device of claim 3 further comprising means for transferring said fluid image from said layer to a transfer surface.

5. A magnetic recording device of claim 2 further comprising means for maintaining the distance constant.

6. A method for forming a visible image on a magnetic layer, comprising forming a magnetic image on said layer, moving said layer at a distance spaced from a top surface of a body of a magnetic fluid, and maintaining said distance constantly at a distance sufficient to enable fluid of said body to be moved to contact said layer by magnetic attraction of said magnetic image.

7. A method according to claim 6, wherein said magnetic layer comprises a surface layer on a cylindrical body having a rotational axis parallel to the surface of said body of magnetic fluid, wherein said step of moving comprises rotating said cylindrical body.

* * * * *